| | | | |
|---|---|---|---|
|  | | | |

(12) United States Patent
England et al.

(10) Patent No.: US 12,437,086 B2
(45) Date of Patent: Oct. 7, 2025

(54) SYSTEM FOR IMPROVING THE RESOURCE EVENT DEVICE REMOVAL PROCESS

(71) Applicant: BANK OF AMERICA CORPORATION, Charlotte, NC (US)

(72) Inventors: Tony England, Tega Cay, SC (US); Steven Michael Twombly, Saco, ME (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 955 days.

(21) Appl. No.: 17/527,909

(22) Filed: Nov. 16, 2021

(65) Prior Publication Data

US 2023/0153446 A1    May 18, 2023

(51) Int. Cl.
   *G06F 21/60*   (2013.01)

(52) U.S. Cl.
   CPC .................... *G06F 21/604* (2013.01)

(58) Field of Classification Search
   None
   See application file for complete search history.

(56) References Cited

U.S. PATENT DOCUMENTS

| | | |
|---|---|---|
| 7,693,771 B1 | 4/2010 | Zimmerman et al. |
| 7,734,545 B1 | 6/2010 | Fogliano et al. |
| 8,290,865 B2 | 10/2012 | Lawrence et al. |
| 8,311,943 B2 | 11/2012 | Patterson |
| 8,737,954 B2 | 5/2014 | Salonen |
| 8,737,955 B2 | 5/2014 | Salonen |
| 8,737,959 B2 | 5/2014 | Salonen |
| 8,924,291 B2 | 12/2014 | Bixler et al. |
| 9,392,309 B2* | 7/2016 | Jin ..................... H04N 21/8352 |
| 9,530,125 B2 | 12/2016 | Bacastow |
| 9,607,334 B2 | 3/2017 | Carroll et al. |
| 9,773,262 B2 | 9/2017 | Rosano et al. |
| 10,223,677 B2 | 3/2019 | Zamer |
| 10,817,856 B2 | 10/2020 | Berger et al. |
| 11,087,310 B2 | 8/2021 | Jain et al. |
| 11,151,529 B1 | 10/2021 | Nolte et al. |
| 11,276,063 B2 | 3/2022 | Kohli |
| 11,568,371 B2 | 1/2023 | Kaitha et al. |
| 2016/0180302 A1 | 6/2016 | Bagot, Jr. |
| 2016/0253639 A1 | 9/2016 | Sharma |
| 2020/0027301 A1 | 1/2020 | Beskitt et al. |
| 2021/0241256 A1* | 8/2021 | Caldwell ............... G06Q 20/385 |
| 2021/0319092 A1* | 10/2021 | Holm ..................... G06F 21/44 |

* cited by examiner

*Primary Examiner* — Farid Homayounmehr
*Assistant Examiner* — Suman Debnath
(74) *Attorney, Agent, or Firm* — Moore & Van Allen PLLC; Anup Iyer

(57) ABSTRACT

Intelligently determination of intent of a resource provider when attempting to delete a resource event device, specifically, the resource event credentials associated with the resource event device, from a network location. Intent is determined by implementing Artificial Intelligence (AI) to analyze the resource provider's historical data to determine a probable/possible intent and, in response, queries are presented to the resource provider that attempt to confirm the probable/possible intent as the actual intent. In response to determining the intent, the invention is configured to perform one or more actions that are based on the determined intent.

15 Claims, 7 Drawing Sheets

SYSTEM FOR IMPROVING THE RESOURCE EVENT DEVICE REMOVAL PROCESS

FIELD OF THE INVENTION

The present invention is generally related to computing security and, more specifically, improving the process whereby a resource provider is ensured of the removal resource event devices (i.e., resource event credentials) from a network location while intelligently understanding the resource provider's intent during the removal event.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention provide for systems, methods, computer program product and/or the like that intelligently determine the intent of a resource provider when attempting to delete a resource event device, specifically the resource event credentials associated with the device, from a network location. In specific embodiments of the invention, the intent is determined by implementing Artificial Intelligence (AI) to analyze the resource provider's historical data to determine a probable/possible intent and, in response, queries are presented to the resource provider that attempt to confirm the probable/possible intent as the actual intent.

In response to determining the intent, the invention is configured to perform one or more actions that are based on the determined intent. For example, if the intent is determined to be cancelation of a recurring resource event, the actions may comprise messaging the resource recipient to indicate the resource provider's intention to cancel the recurring resource event, receiving a response from the resource recipient that provides parameters for continuing the recurring resource event, presenting the resource provider with an option to either accept the parameters and continue the recurring resource event or decline the parameters and delete the resource event device from the network location. In response to the resource recipient accepting the parameters, another message is communicated to the resource recipient that indicates the acceptance of the parameters and, in response to the resource provider declining the parameters, another message is communicated to the resource recipient that indicates declination of parameters and initiates the removal of the resource event credentials associated with the resource event device from the network location.

In other examples, if the intent is determined to be replacing the resource event device with another resource event device from the same resource holding entity, the actions may comprise presenting to the resource provider one or more other resource event devices held by the resource recipient and issued by the same resource holding entity and, in response, receiving an input from the resource recipient that selects one of the other resource event devices. In response to the input/selection, a message is communicated to the resource recipient that initiates replacing the resource event credentials of the existing resource event device (i.e., deleting the credentials) with resource event credentials of the selected resource event device). Conversely, if the intent is determined to be replacing the resource event device with another resource event device from a different resource holding entity, the actions may comprise determining resource provider-specific parameters for continuing use of the resource event device, presenting the resource provider with an option to either accept the parameters and continue use of the resource event device or decline the parameters and delete the resource event device from the network location. In response to the resource recipient accepting the parameters, reconfiguring future resource events based on the accepted parameters and, in response to the resource provider declining the parameters, communicating a message to the resource recipient that initiates the removal of the resource event credentials associated with the resource event device from the network location.

A system for resource event device removal defines first embodiments of the invention. The system includes a network location associated with a resource recipient. The network location includes a data repository that stores resource event credentials associated with one or more resource event devices held by a resource provider and issued by a resource holding entity. The system additionally includes a computing platform controlled by the resource holding entity and including a memory and at least one computing processing device in communication with the memory. The memory stores instructions that are executable by one or more of the at least one computing processing devices. The instructions are configured to receive an input from the resource provider that indicates a desire to remove at least a portion of the resource event credentials from the network location (i.e., one or more of resource event devices) associated with the resource recipient. In response in response to receiving the input, the instructions are further configured to determine an intent of the resource provider in providing the input. Additionally, in response to determining the intent, the instructions are configured to perform an action associated with the determined intent.

In specific embodiments of the system, the instructions configured to determine the intent of the resource provider are further configured to (i) implement artificial intelligence (AI) to analyze historical data associated with the resource provider to identify at least one possible intent of the resource provider, (ii) present one or more queries to the resource provider that are configured to confirm the possible intent, and (iii) receive responses to the one or more queries that confirm the possible intent as the intent of the resource provider. In related embodiments of the system the instructions configured to determine the intent of the resource provider are further configured to receive responses to the one or more queries that fail to confirm the possible intent as the intent of the resource provider, and based on the responses to the one or more queries that fail to confirm the possible intent, iteratively, perform further analysis of the historical data, and continually present additional queries until responses to the additional queries confirm the intent of the resource provider.

In further specific embodiments of the system, the instructions configured to determine the intent of the resource provider are further configured to determine that the resource provider intends to cancel a recurring resource event conducted between the resource provider and the resource recipient that uses the resource event credentials associated with at least one of the one or more resource event devices. In related embodiments of the system, the instructions configured to perform the action further define the action as including communicating a first message to the resource recipient that indicates the intent of the resource provider to cancel the recurring resource event. In further related embodiments of the system, the instructions configured to perform the action further define the action as including, in response to communicating the first message to the resource recipient, receiving a response message from the resource recipient that provides parameters for continuing the recurring resource event, and presenting, to the resource provider, an input option to (i) accept the parameters for continuing the recurring resource event, or (ii) decline the parameters and cancel the recurring resource event. In further related embodiments of the system, the instructions configured to perform the action further define the action as including either one of (i) in response to the resource provider providing a second input that accepts the parameters for continuing the recurring resource event, communicating a second message to the resource provider that indicates acceptance of the parameters by the resource provider, or (ii) in response to the resource provider providing the second input that declines the parameters for continuing the recurring resource event, communicating a third message to the resource provider that indicates declination of the parameters by the resource provider and initiates removal, from the data repository, of the resource event credentials associated with the at least one of the one or more resource event devices.

In additional specific embodiments of the system, the instructions configured to determine the intent of the resource provider are further configured to determine that the resource provider intends to replace the resource event device with another resource event device. In related embodiments of the system, the instructions configured to determine the intent of the resource provider are further configured to determine that the other resource event device is associated with a same resource holding entity as the resource event device. In such embodiments of the system, the instructions configured to perform the action further define the action as including (i) receiving a second input from the resource provider that selects the other resource event device from amongst one or more other resource event devices, and (ii) communicating a message to the resource recipient that initiates replacement of the resource event credentials associated with the resource event device with other resource event credentials associated with the selected other resource event device. In other related embodiments of the system, the instructions configured to determine the intent of the resource provider are further configured to determine that the other resource event device is associated with a different resource holding entity as the resource event device. In such embodiments of the system, the instructions configured to perform the action further define the action as including determining resource provider-specific parameters for continuing use of the resource event device for the recurring resource events, and presenting, to the resource provider, an input option to (i) accept the parameters for continuing use of the resource event device for the recurring resource event, or (ii) decline the parameters and remove the resource event credentials associated with the resource event credentials from the data repository. In other related embodiments of the system, the instructions configured to perform the action further define the action as including, in response to the resource provider providing a second input that accepts the parameters for continuing use of the resource event device, reconfiguring at least one of the recurring resource events based on the accepted parameters, and, in response to the resource provider providing the second input that declines the parameters for continuing the recurring resource event, communicating a message to the resource provider that initiates removal of the resource event credentials associated with the resource event device from the data repository.

A computer-implemented method for removing a resource event device from a network location defines second embodiments of the invention. The computer-implemented method is executed by one or more computer processing devices. The computer-implemented method includes receiving an input from a resource provider that indicates a desire to remove, from a data repository at the network location at least a portion of resource event credentials associated with at least one resource event device held by the resource provider. The method further includes, in response to receiving the input, determining an intent of the resource provider in providing the input, and, in response to determining the intent, performing an action associated with the determined intent.

In specific embodiments of the computer-implemented method, determining the intent of the resource provider further comprises implementing artificial intelligence (AI) to analyze historical data associated with the resource provider to identify at least one possible intent of the resource provider and, in response to the analysis, presenting one or more queries to the resource provider that are configured to confirm the possible intent. Additionally, the method includes either (i) receiving responses to the one or more queries that seek to confirm the possible intent as the intent of the resource provider, or (ii) receiving responses to the one or more queries that fail to confirm the possible intent as the intent of the resource provider, and, in response, iteratively, (i) analyzing the historical data further to identify further possible intent, and (ii) continually presenting additional queries that seek to confirm the further possible intent until responses to the additional queries confirm the further possible intent as the intent of the resource provider.

In further embodiments of the computer-implemented method, determining the intent of the resource provider further includes determining that the resource provider intends to cancel a recurring resource event conducted between the resource provider and the resource recipient using the resource event credentials associated with at least one of the one or more resource event devices. In such embodiments of the computer-implemented method, performing the action further includes communicating a first message to the resource recipient that indicates the intent of the resource provider to cancel the recurring resource event and, in response, receiving a response message from the resource recipient that provides parameters for continuing the recurring resource event and presenting, to the resource provider, an input option to (i) accept the parameters for continuing the recurring resource event, or (ii) decline the parameters and cancel the recurring resource event. In addition, the computer-implemented method includes either in response to the resource provider providing a second input that accepts the parameters for continuing the recurring resource event, communicating a second message to the resource provider that indicates acceptance of the parameters by the resource provider, or, in response to the resource provider providing the second input that declines the parameters for continuing the recurring resource event, communicating a third message to the resource provider that indicates declination of the parameters by the resource provider and initiates removal, from the data repository, of the resource event credentials associated with the at least one of the one or more resource event devices.

In still further specific embodiments of the computer-implemented method, determining the intent of the resource provider further includes determining that (i) the resource provider intends to replace the resource event device with another resource event device; and (ii) the other resource event device is associated with a same resource holding entity as the resource event device. In such embodiments of the computer-implemented method, performing the action further includes receiving a second input from the resource provider that selects the other resource event device from amongst one or more other resource event devices, and communicating a message to the resource recipient that initiates replacement of the resource event credentials associated with the resource event device with other resource event credentials associated with the selected other resource event device.

In other specific embodiments of the computer-implemented method, determining the intent of the resource provider further includes determining that (i) the resource provider intends to replace the resource event device with another resource event device, and (ii) the other resource event device is associated with a different resource holding entity as the resource event device. In such embodiments of the computer-implemented method, performing the action further includes determining resource provider-specific parameters for continuing use of the resource event device for the recurring resource events, and presenting, to the resource provider, an input option to (i) accept the parameters for continuing use of the resource event device for the recurring resource event, or (ii) decline the parameters and remove the resource event credentials associated with the resource event credentials from the data repository. In addition, the computer-implemented method includes one of (i) in response to the resource provider providing a second input that accepts the parameters for continuing use of the resource event device, reconfiguring at least one of the recurring resource events based on the accepted parameters, or (ii) in response to the resource provider providing the second input that declines the parameters for continuing the recurring resource event, communicating a message to the resource provider that initiates removal of the resource event credentials associated with the resource event device from the data repository.

A computer program product including a non-transitory computer-readable medium defines third embodiments of the invention. The computer-readable medium includes a first set of codes for causing a computer to receive an input from a resource provider that indicates a desire to remove, from a data repository at a network location at least a portion of resource event credentials associated with at least one resource event device held by the resource provider. Additionally, the computer-readable medium includes a second set of codes for causing a computer to, in response to receiving the input, determine an intent of the resource provider in providing the input. In addition, the computer-readable medium includes a third set of codes for causing a computer to, in response to determining the intent, perform an action associated with the determined intent.

In specific embodiments of the computer program product, the third set of codes are further configured to cause the computer to implement artificial intelligence (AI) to analyze historical data associated with the resource provider to identify at least one possible intent of the resource provider, present one or more queries to the resource provider that are configured to confirm the possible intent, and one of (i) receive responses to the one or more queries that seek to confirm the possible intent as the intent of the resource provider, or (ii) receive responses to the one or more queries that fail to confirm the possible intent as the intent of the resource provider, in response, iteratively, analyze the historical data further to identify further possible intent, and continually present additional queries that seek to confirm the further possible intent until responses to the additional queries confirm the further possible intent as the intent of the resource provider.

In further specific embodiments of the computer program product, the second set of codes are further configured to cause the computer to determine that (i) the resource provider intends to cancel a recurring resource event conducted between the resource provider and (ii) the resource recipient using the resource event credentials associated with at least one of the one or more resource event devices. In such embodiments of the computer program product, the third set of codes are further configured to cause the computer to communicate a first message to the resource recipient that indicates the intent of the resource provider to cancel the recurring resource event, and, in response, receive a response message from the resource recipient that provides parameters for continuing the recurring resource event, present, to the resource provider, an input option to (i) accept the parameters for continuing the recurring resource event, or (ii) decline the parameters and cancel the recurring resource event. Further, the third set of codes are further configured to either, in response to the resource provider providing a second input that accepts the parameters for continuing the recurring resource event, communicate a second message to the resource provider that indicates acceptance of the parameters by the resource provider, or, in response to the resource provider providing the second input that declines the parameters for continuing the recurring resource event, communicating a third message to the resource provider that indicates declination of the parameters by the resource provider and initiates removal, from the data repository, of the resource event credentials associated with the at least one of the one or more resource event devices.

In still further specific embodiments of the computer program product, the second set of codes are further configured to determine that (i) the resource provider intends to replace the resource event device with another resource event device, and (ii) the other resource event device is associated with a same resource holding entity as the resource event device. In such embodiments of the computer program product, the third set of codes are further configured to cause the computer to receive a second input from the resource provider that selects the other resource event device from amongst one or more other resource event devices, and communicate a message to the resource recipient that initiates replacement of the resource event credentials associated with the resource event device with other resource event credentials associated with the selected other resource event device.

Thus, according to embodiments of the invention, which will be discussed in greater detail below, the present invention provides for intelligently determining the intent of a resource provider when attempting to delete/remove a resource event device, specifically the resource event credentials associated with the device, from a network location. In specific embodiments of the invention, the intent is determined by implementing Artificial Intelligence (AI) to analyze the resource provider's historical data to determine a probable/possible intent and, in response, queries are presented to the resource provider that attempt to confirm the probable/possible intent as the actual intent. In response to determining the intent, the invention is configured to perform one or more actions that are based on the determined intent.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
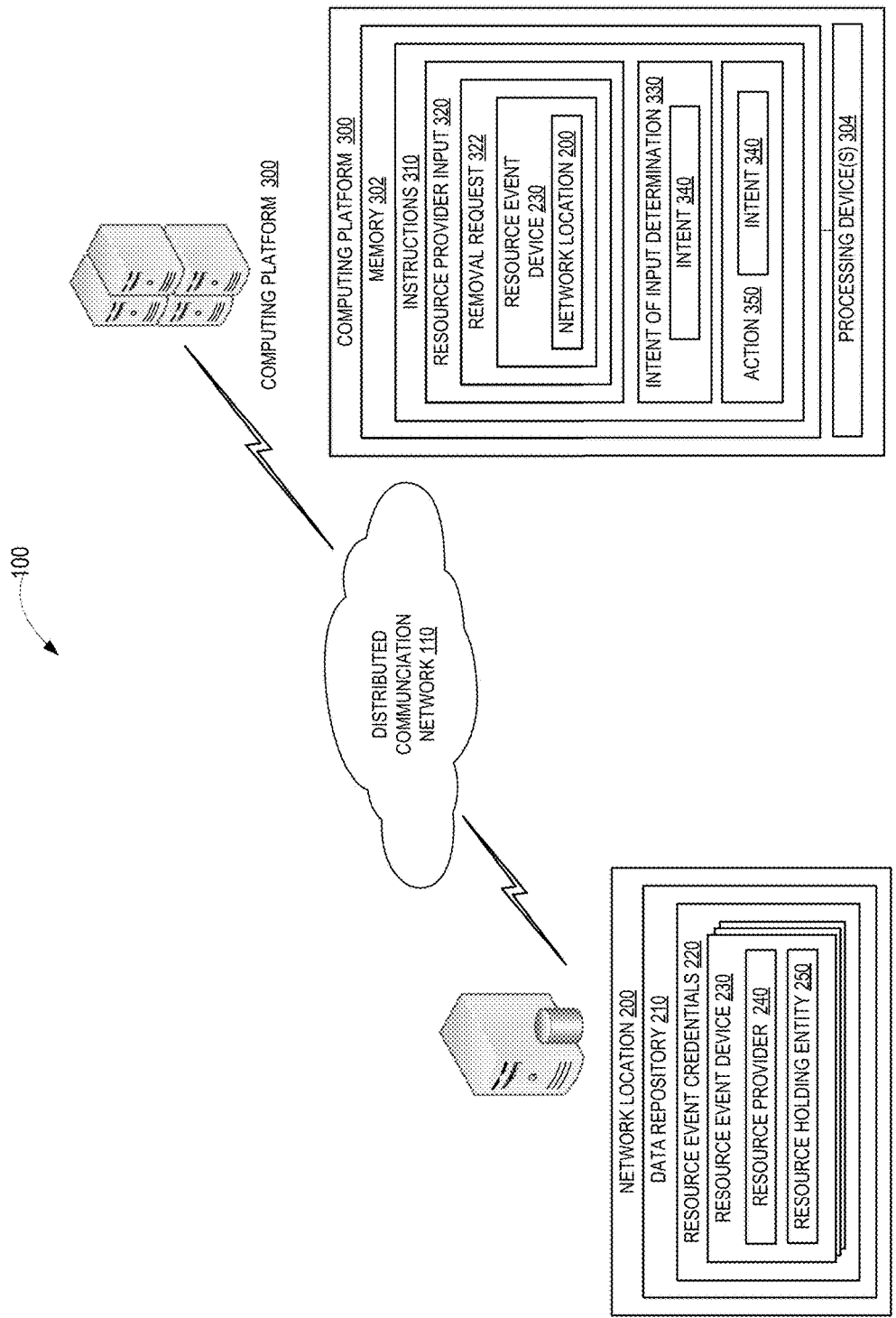
Figure 2:
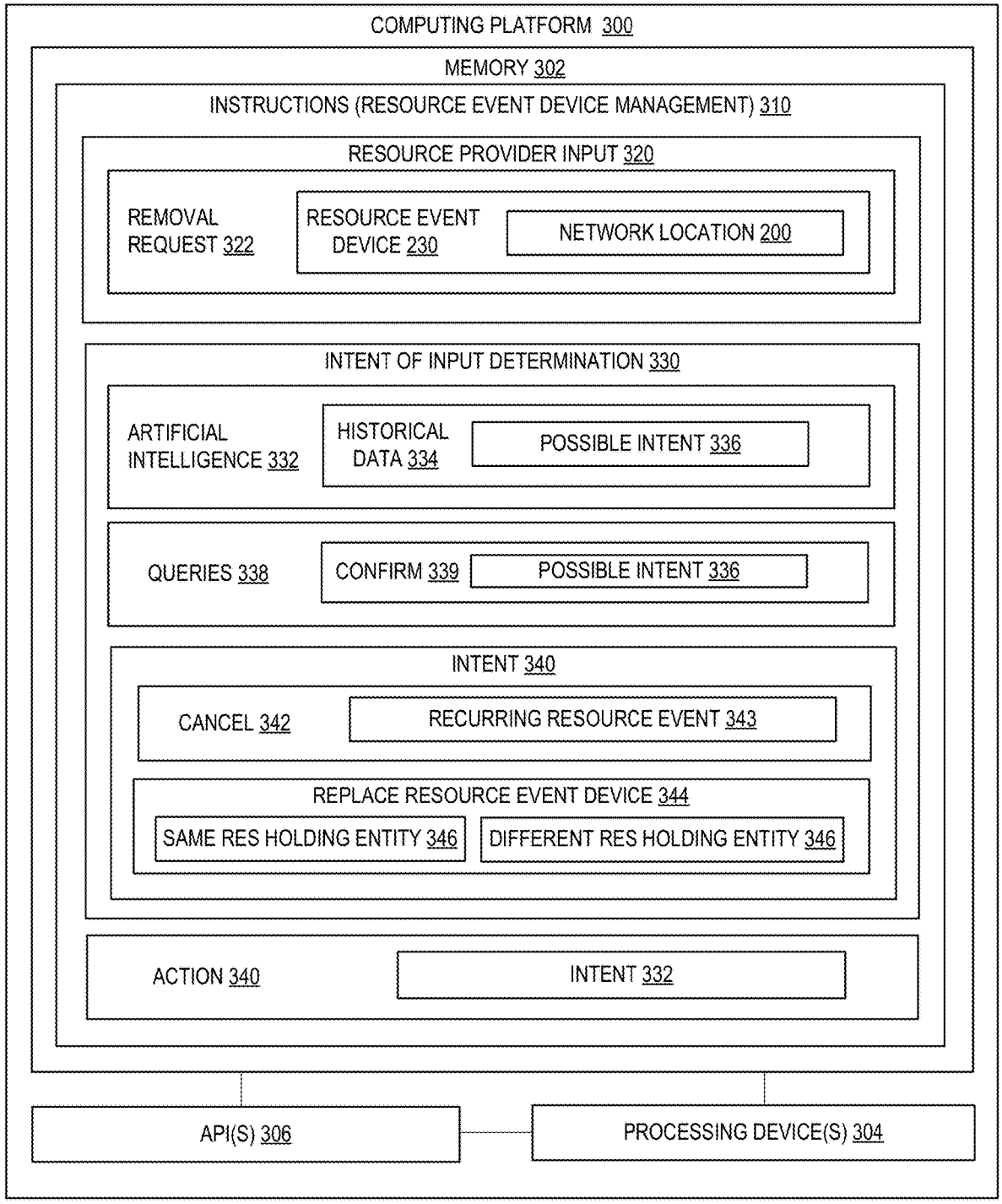
Figure 3:
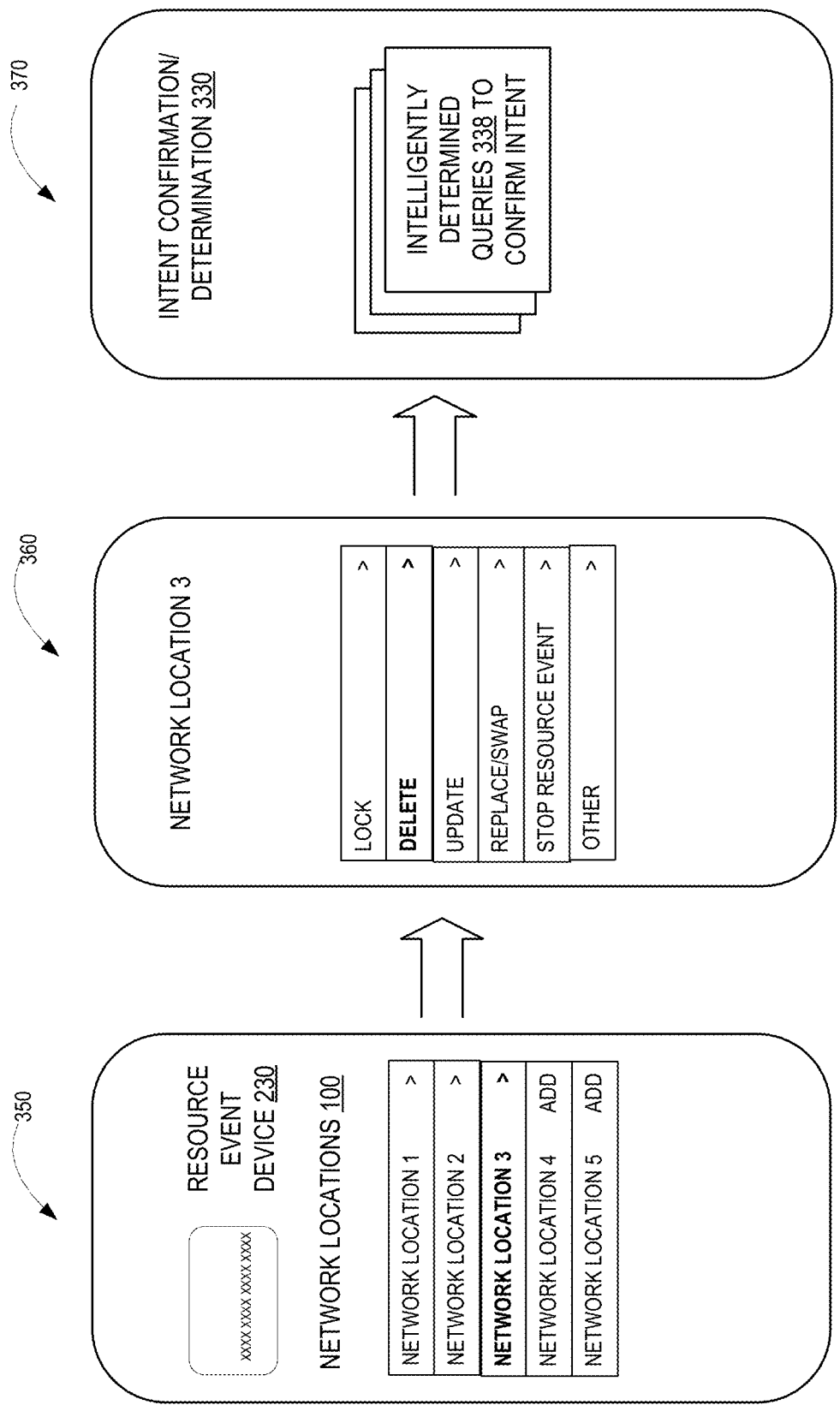
Figure 4:
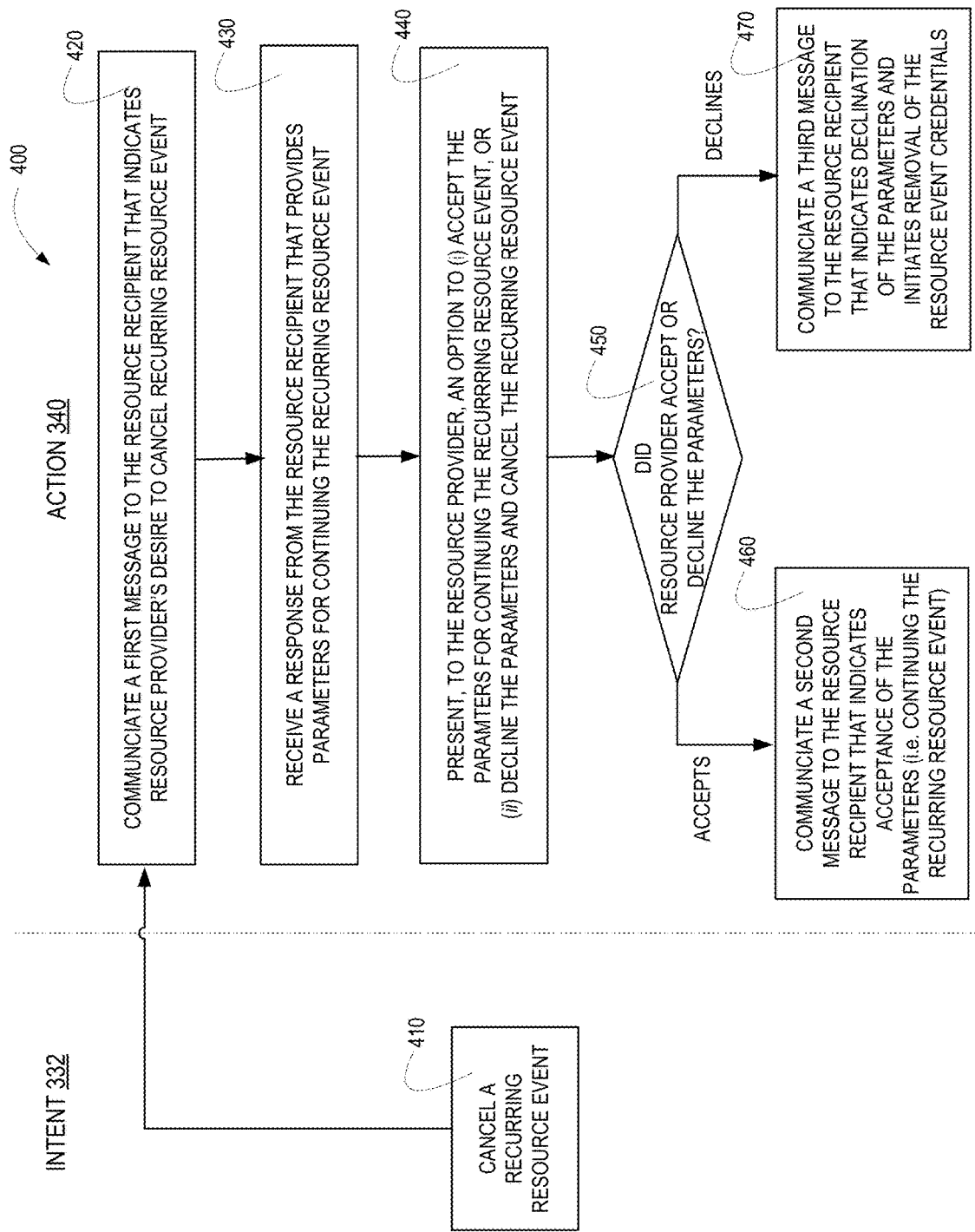
Figure 5:
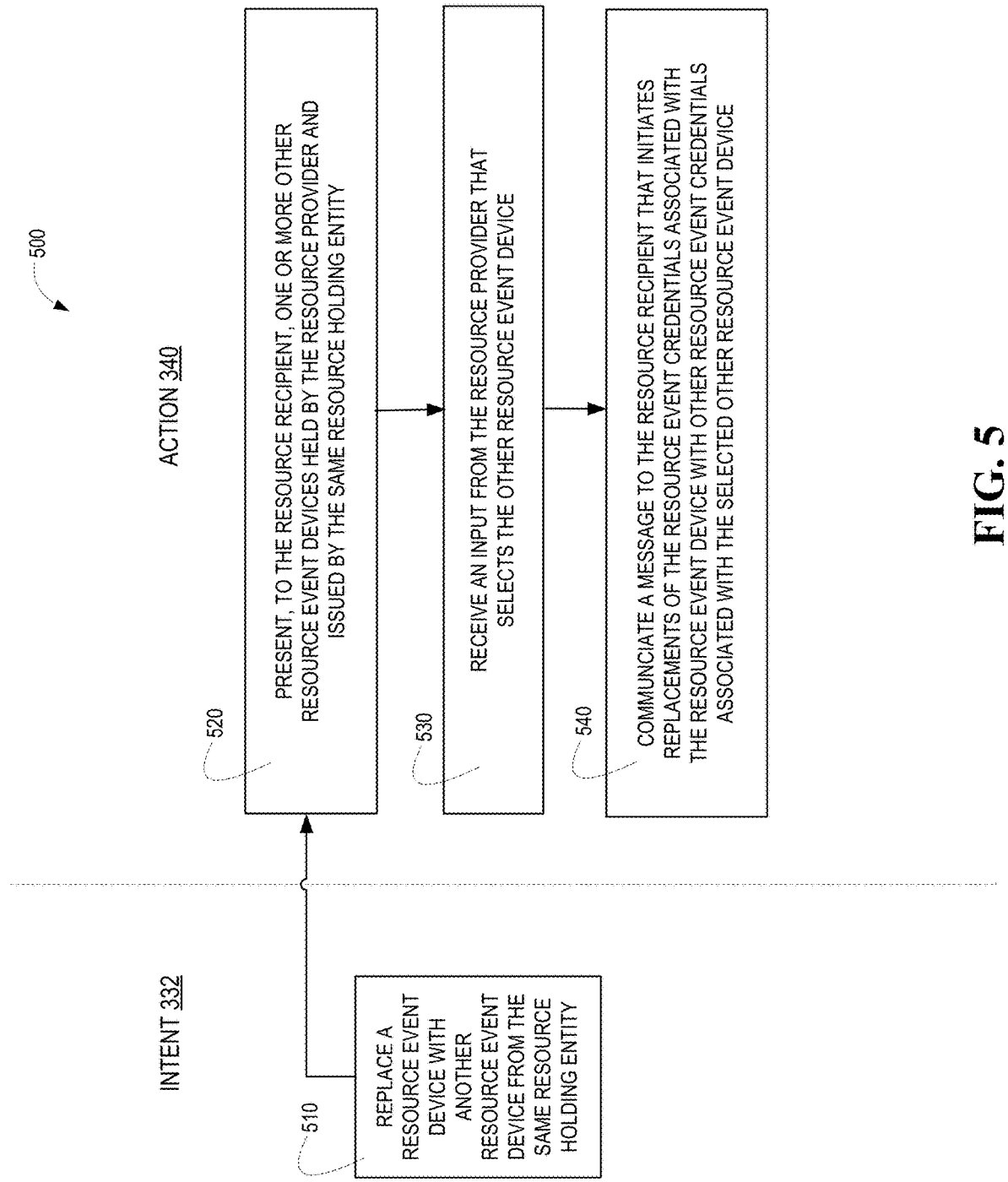
Figure 6:
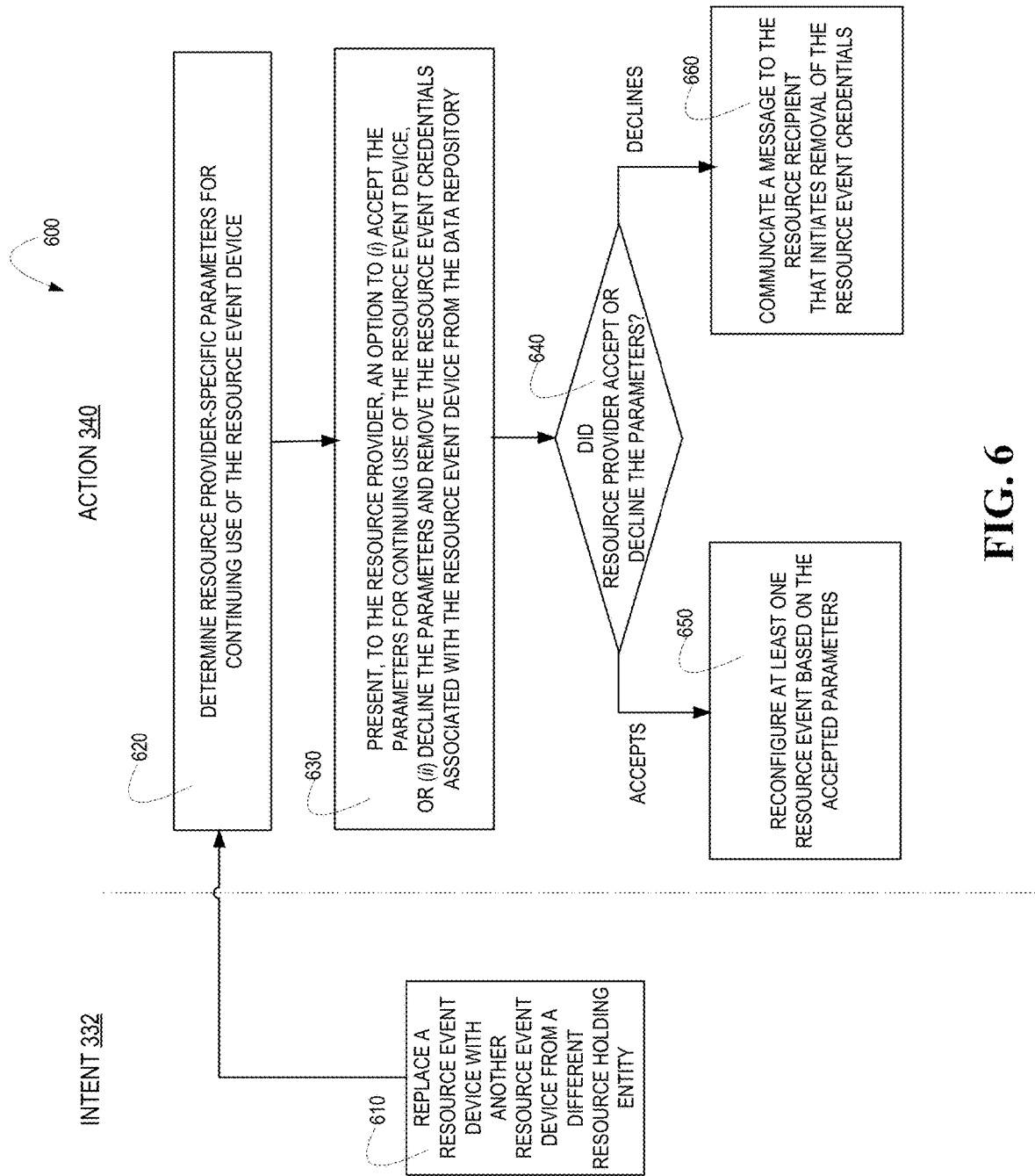
Figure 7:
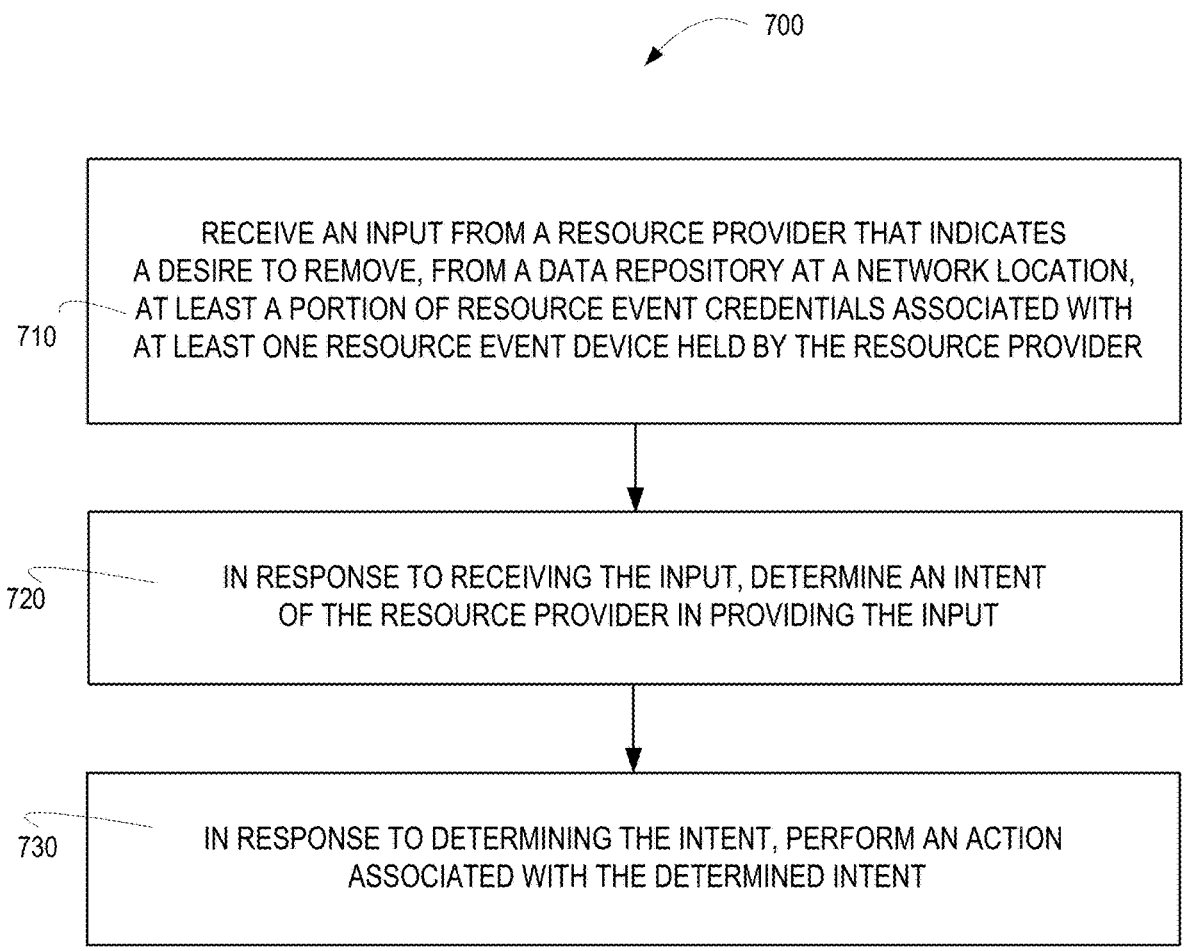

Having thus described embodiments of the disclosure in general terms, reference will now be made to the accompanying drawings, wherein:

FIG. 1 is a schematic diagram of a system for determining the intent of a request to remove a resource event device and performing action(s) based on the determined intent, in accordance with embodiment of the present invention;

FIG. 2 is a block diagram of a computing platform for determining the intent of a request to remove a resource event device and performing action(s) based on the determined intent, in accordance with embodiments of the present invention;

FIGS. 3A, 3B and 3C are user interfaces configured for managing resource event devices including deleting resource event devices from network locations, in accordance with embodiments of the present invention;

FIG. 4 is a flow diagram of a method for determining that the resource provider's intent is to a cancel a recurring resource event and, in response, performing prescribed actions, in accordance with embodiments of the present invention;

FIG. 5 is a flow diagram of a method for determining that the resource provider's intent is to a replace a resource event device with another resource event device from the same resource holding entity and, in response, performing prescribed actions, in accordance with embodiments of the present invention;

FIG. 6 is a flow diagram of a method for determining that the resource provider's intent is to a replace a resource event device with another resource event device from a different resource holding entity and, in response, performing prescribed actions, in accordance with embodiments of the present invention; and FIG. 7 is a flow diagram of a method for determining the intent of a request to remove a resource event device and performing action(s) based on the determined intent, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processing device of a general purpose computer, special purpose computer, or other programmable data processing apparatus to produce a particular machine, such that the instructions, which execute by the processing device of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processing device may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods, computer program product and/or the like are provided for intelligently determining the intent of a resource provider when attempting to delete a resource event device, specifically the resource event credentials associated with the device, from a network location. In specific embodiments of the invention, the intent is determined by implementing Artificial Intelligence (AI) to analyze the resource provider's historical data to determine a probable/possible intent and, in response, queries are presented to the resource provider that attempt to confirm the probable/possible intent as the actual intent.

In response to determining the intent, the invention is configured to perform one or more actions that are based on the determined intent. For example, if the intent is determined to be cancelation of a recurring resource event, the actions may comprise messaging the resource recipient to indicate the resource provider's intention to cancel the recurring resource event, receiving a response from the resource recipient that provides parameters for continuing the recurring resource event, presenting the resource provider with an option to either accept the parameters and continue the recurring resource event or decline the parameters and delete the resource event device from the network location. In response to the resource recipient accepting the parameters, another message is communicated to the resource recipient that indicates the acceptance of the parameters and, in response to the resource provider declining the parameters, another message is communicated to the resource recipient that indicates declination of parameters and initiates the removal of the resource event credentials associated with the resource event device from the network location.

In other examples, if the intent is determined to be replacing the resource event device with another resource event device from the same resource holding entity, the actions may comprise presenting to the resource provider one or more other resource event devices held by the resource recipient and issued by the same resource holding entity and, in response, receiving an input from the resource recipient that selects one of the other resource event devices. In response to the input/selection, a message is communicated to the resource recipient that initiates replacing the resource event credentials of the existing resource event device (i.e., deleting the credentials) with resource event credentials of the selected resource event device). Conversely, if the intent is determined to be replacing the resource event device with another resource event device from a different resource holding entity, the actions may comprise determining resource provider-specific parameters for continuing use of the resource event device, presenting the resource provider with an option to either accept the parameters and continue use of the resource event device or decline the parameters and delete the resource event device from the network location. In response to the resource recipient accepting the parameters, reconfiguring future resource events based on the accepted parameters and, in response to the resource provider declining the parameters, communicating a message to the resource recipient that initiates the removal of the resource event credentials associated with the resource event device from the network location.

Turning now to the figures, FIG. 1 is a schematic diagram is system 100 for determining the intent of a request to remove a resource event device and performing action(s) based on the determined intent, in accordance with embodiments of the present invention. The system 200 is implemented across a distributed communication network 110 that may include the Internet, one or more intranets, one or more cellular networks or the like. The system includes a network location 200 comprising a data repository 210. The data repository stores resource event credentials 220 associated with one or more resource event devices 230 held by a resource provider 240 and issued by a resource holding entity 250.

In specific embodiments of the invention, the network location may a merchant website (e.g., web server), a digital wallet storage location (e.g., physical or cloud storage) or the like. In such embodiments of the invention, the resource event credentials may include account number(s), tokens or the like and the resource event device may be credit/debit card or the like held by the resource provider (e.g., user/payor) and issued by the resource holding entity (e.g., a financial institution or the like). In such embodiments, the user (i.e., credit/debit card holder) may desire to remove/delete a credit/debit card from a merchant website, a digital wallet or the like and, the invention is configured to determine the user's intent in removing the credit/debit card and performing prescribed actions in response to the determined intent.

The system 100 additionally includes additionally includes computing platform 300 which includes a memory 302 and at least one processing device 304 in communication with memory 302. Memory 302 stores instructions 310 that are executable by the least one processing device 304. Instructions 310 are configured to receive an input 320 from the resource provider 240 that requests removal 322 of a resource event device 230 from the network location 200. In response to receiving the input 320, the instructions 310 are configured to perform an intent of input determination 330 that determines the intent 340 of the resource provider 240 in providing the input 320. In response to determining the intent 340, the instructions 310 are configured to perform one or more actions 350 that are associated with the determined intent 340.

In specific embodiments of the invention, in which the resource event device 310 is a credit/debit card, the input 320 may be provided to a credit/debit card management portal or the like typically controlled by a card-issuing entity (e.g., financial institution or the like). The credit/debit card holder/user may desire to remove the credit/debit card from a merchant website, a digital wallet or the like. In such embodiments of the invention, the intent 340 may include, but is not limited to, a cancelling a recurring resource event (i.e., a subscription service or the like), replacing the resource event device with another resource event device issued by the same or a different resource holding entity (e.g., replacing an existing credit/debit card with another credit/debit card issued by the same or different financial institution or the like).

Referring to FIG. 2 a block diagram is presented of the computing platform 300, in accordance with embodiments of the present invention. The computing platform 300 may comprise one or more computing devices (e.g., servers, computing devices, or the like), and is configured to execute instructions, algorithms, modules, routines, applications, such as instructions 310. Computing platform 300 includes memory 302, which may comprise volatile and non-volatile memory, such as read-only and/or random-access memory (RAM and ROM), EPROM, EEPROM, flash cards, or any memory common to computing platforms). Moreover, memory 302 may comprise cloud storage, such as provided by a cloud storage service and/or a cloud connection service.

Further, computing platform 300 also includes at least one processing device 304, which may be an application-specific integrated circuit ("ASIC"), or other chipset, logic circuit, or other data processing device. Processing device(s) 304 may execute one or more application programming interface (APIs) 306 that interface with any resident programs, such as instructions 310 or the like, stored in the memory 302 of the computing platform 300 and any external programs. Processing devices(s) 304 may include various processing subsystems (not shown in FIG. 2) embodied in hardware, firmware, software, and combinations thereof, that enable the functionality of the computing platform 300 and the operability of the computing platform 300 on the distributed communication network 110 (shown in FIG. 1). For example, processing subsystems allow for initiating and maintaining communications and exchanging data with other networked devices, such as network location 200. For the disclosed aspects, processing subsystems of processing device 304 may include any processing subsystem used in conjunction with instructions 310 and related tools, routines, modules, sub-routines, algorithms, sub-algorithms, sub-modules thereof.

Computing platform 300 may additionally include a communications module (not shown in FIG. 2) embodied in hardware, firmware, software, and combinations thereof, that enables electronic communications between the computing platform 300 and other network devices, such as network location 200 (shown in FIG. 1). Thus, communication module may include the requisite hardware, firmware, software and/or combinations thereof for establishing and maintaining a network communication connection with one or more network devices.

Memory 302 of computing platform 300 stores instructions 310 that may be part of a more comprehensive resource event management system, such as a credit/debit card management system that allows for credit/debit card holders to manage their use of credit/debit cards as various network locations (e.g., websites, digital wallets and the like).

Instructions 310 are configured to receive an input 320 from the resource provider 240 that requests removal 322 of a resource event device 230 from the network location 200. For example in specific embodiments of the invention, the input 320 is a removal request 322 provided by a credit/debit card holder to remove/delete a credit/debit card (i.e., the resource event device 230) from a merchant website, digital wallet or the like (i.e., the network location 200).

In response to receiving the input 320, the instructions 310 are configured to determine 330 the intent 340 of the resource provider 240 in providing the input 320. In specific embodiments of the invention, intent 340 may be determined by implementing Artificial Intelligence (AI) 332 or the like to analyze historical data 334 associated with the resource provider 240/user to determine a possible intent 336. In response to determining the possible intent 336, queries 338 are presented to the resource provider/user 240 which seek to confirm 339 the possible intent 336 as the intent 340 (i.e., actual intent). In the event that the queries 338 are unable to confirm 339 the possible intent 336 as the intent 340, further analysis of the historical data 334 to determine a next most likely possible intent 336 with corresponding queries 338 presented to the resource provider 240 to confirm 339 the possible intent 336 as the intent 340. The process of analyzing the historical data 334, determining a possible intent 336 and presenting queries 338 continues, iteratively, until the possible intent 336 is confirmed 339 as the intent (i.e., actual intent). In those embodiments of the invention, in which the resource event device is a credit/debit card, the historical data 334 may be historical transaction data, historical data indicating acquisition of new financial institution products (e.g., new credit/debit cards or the like) or the like.

As previously discussed the intent 340 may include, but is not limited to, a cancelling 342 a recurring resource event 343 (i.e., a subscription service or the like), replacing 344 the resource event device 230 with another resource event device issued by the same resource holding entity 346 or a different resource holding entity 346. For example, in specific embodiments of the invention, replacing an existing credit/debit card with another credit/debit card issued by the same or a different financial institution or the like).

In response to determining the intent 340, the instructions 310 are configured to perform one or more actions 350 that are associated with the determined intent 340. Examples of actions 350 that performed in response to a determining various different intents are described in relation to FIGS. 4-6, infra.

Referring to FIGS. 3A, 3B and 3C, schematic diagrams are shown of exemplary user interfaces 350, 360 and 370 for resource event management, in accordance with embodiments of the present invention. Referring specifically to FIG. 3A, user interface 350 presents to the resource provider/user options for managing resource event device 230 at various network locations 100. As previously discussed, in specific embodiments of the invention, network location 100 may be a merchant website, a digital wallet or the like. Network locations 100 at which the resource event device 230 is currently used are indicated by the ">" symbol to the right of the network location indicator/name (e.g., Network Location 1, Network Location 2 and Network Location 3), which means that the resource event credentials (e.g., account number, token or the like) are stored within the network location's data repository. The network locations 100 indicating current use may be intelligently determined based on historical transaction data and/or inputted by the resource provider/user. Network locations 100 at which the resource event device 230 is not currently used are indicated by the "ADD" designator to the right of the network location indicator/name, which means that the resource provider/user may add the resource event device to the network location via the resource event management portal as opposed to having to enter the resource event device details at the network location 100 (i.e., at the merchant website or within a digital wallet application). Activating the "ADD" designator will provide one or more user interfaces requesting further resource event details (e.g., Card Verification Value (CVV) or the like) and/or user authorization for adding the resource event device 230 to the selected network location 100.

As shown in the illustrated example of FIG. 3A, the resource provider/user has selected/activated "Network Location 3" and, in response user interface 360 (FIG. 3B) is presented which provides the resource provider/user various options for managing the resource event device 230 at the selected network location 100 (i.e., Network Location 3). The options include, but are not limited to, (i) lock, which prohibits use of the resource event device 230 at the network location 100 (i.e., Network Location 3) until the resource provider/user unlocks the resource event device 230; (ii) delete, which provides for the resource event credentials (i.e., account number, token and/or the like) associated with the resource event device 230 to be deleted/removed from the network location 100 (i.e., Network Location 3); (iii) update, which provides for the addition of updated resource event device details in the event that the resource event device has been updated (i.e., a replacement resource event device has issued); (iv) replace/swap, which provides to replacing an existing resource event device at the network location 100 (i.e., Network Location 3) with another resource event device; (v) stop resource event provides for cancelling an upcoming scheduled resource event (e.g., cancelling a pending recurring resource event).

As shown in the illustrated example of FIG. 3B, the resource provider/user has selected the "delete" option. In conventional operation, the resource event device managing entity, such as a resource holding entity (e.g., a financial institution) is unaware of the rational/reasoning/intent of the resource provider/user in wanting to delete/remove the resource event device (e.g., debit/credit card) from the network location 100. However, according to embodiments of the present invention, the resource/provider's selection/input of the deletion request prompts determination of the resource provider's/user's intent. As previously discussed, in specific embodiments, artificial intelligence will be implemented to analyze the resource provider's/user's historical data (e.g., historical transaction data, historical financial institution product acquisition/cancellation data or the like) to determine a possible intent (e.g., known recurring resource events at the network location, recent acquisition or cancellation of a resource event device or the like). In response to determining the possible intent, in the user interface 370 shown in FIG. 3C, one or more queries 338 are presented to the resource provider/user as a means of intent confirmation determination 330 (i.e., confirming that a possible intent is the actual intent).

As previously discussed, in the event that the queries 338 are unable to confirm the possible intent as the actual input, further analysis of the historical data occurs to determine a next most likely possible intent with corresponding queries 338 presented to the resource provider/user to confirm the possible intent as the intent. The process of analyzing the historical data, determining a possible intent and presenting queries 338 continues, iteratively, until the possible intent 336 is confirmed as the actual intent.

Once the intent has been determined one or more actions are performed, which, according to specific embodiments of the invention, may include presenting further queries to the resource provider user which are related to the determined intent. Such actions are detailed in the flow diagrams of FIGS. 4-6, which are discussed as follows.

Referring to FIG. 4, a flow diagram is presented of a method 400 for performing actions in response to determining that the intent of the resource provider/user is to cancel a recurring resource event, in accordance with embodiments of the present invention. At Event 410, a determination is made that the intent 332 of the resource provider/user is to cancel a recurring resource event (e.g., cancel a service subscription for which recurring periodical (e.g., monthly) payments are made) or the like.

In response to determining that the intent 332 is for a recurring resource event to be cancelled, at Event 420, actions 340 commence by communicating a first message to the resource recipient (e.g., online merchant or the like) that indicates the resource provider's desire to cancel the recurring resource event (e.g., cancel a service subscription or the like). At Event 430, a response is received from the resource recipient that provides parameters for continuing the recurring resource event. In those embodiments of the invention in which the recurring resource event is associated with a service subscription, the parameters may be cost inducements, such as price reductions, timing for invoking the cost inducements (e.g., number of months over which the cost inducements apply) and the like.

In response to receiving the parameters, at Event 440, an option, typically in the form of a query, is presented to the resource provider/user asking the resource provider/user to choose between (i) accepting the parameters and continuing the recurring resource event, or (ii) declining the parameters and cancelling the recurring resource event.

At Decision 450, a determination is made as to whether the resource provider/user has chosen to (i) accept the parameters and continue the recurring resource event, or (ii) decline the parameters and cancel the recurring resource event. In response to the resource provider/user, accepting the parameters, at Event 460, a second message is communicated to the resource recipient that indicates acceptance of the parameters (i.e., the resource provider's/user's willingness to continue the recurring resource event under the newly accepted parameters). In response to the resource provider/user, declining the parameters, at Event 470, a third message is communicated to the resource recipient that indicates declination of the parameters, cancellation of the recurring resource event and initiates removal of the resource event credentials associated with the resource event device.

Referring to FIG. 5, a flow diagram is presented of a method 500 for performing actions in response to determining that the intent of the resource provider/user is to replace the resource event device with another resource event device from the same resource holding entity, in accordance with embodiments of the present invention. At Event 510, a determination is made that the intent 332 of the resource provider/user is to replace the resource event device with another resource event device from the same resource holding entity (e.g., another credit/debit card issued from the same financial institution that is provides the credit/debit card management portal).

In response to determining that the intent 332 is to replace the resource event device with another resource event device from the same resource holding entity, at Event 520, actions 340 commence by presenting, to the resource recipient, a listing of the one or more other resource event devices held by the resource provider and issued by the same resource holding entity. At Event 530, an input is received from the resource provider that selects one of the one or more other resource event devices.

In response to receiving the input/selection, at Event 540, a message is communicated to the resource recipient that initiates replacement of the resource event credentials associated with the current resource event device with the resource event credentials associated with the selected other resource event device (e.g., replacement of the account number, token and the like of the existing credit/debit card with an account number, token and the like of another credit/debit card).

Referring to FIG. 6, a flow diagram is presented of a method 600 for performing actions in response to determining that intent of the resource provider/user is to replace the resource event device with another resource event device from a different resource holding entity, in accordance with embodiments of the present invention. At Event 610, a determination is made that the intent 332 of the resource provider/user is to replace the resource event device with another resource event device from a different resource holding entity (e.g., another credit/debit card issued from a different financial institution that provides the current credit/debit card (e.g., the financial institution that provides the credit/debit card management portal).

In response to determining that the intent 332 is to replace the resource event device with another resource event device from a different resource holding entity, at Event 620, actions 340 commence by determining resource provider/user-specific parameters for continuing use of the resource event device. In specific embodiments of the invention, the parameters may include price reductions (e.g., percentage or dollar amounts off) for using the current resource event device at the network location, increased rewards for using the current resource event device at the network location and the like.

In response to determining the parameters, at Event 630, an option, typically in the form of a query, is presented to the resource provider/user asking the resource provider/user to choose between (i) accepting the parameters and continuing use of the resource event device, or (ii) declining the parameters and removing the resource event credentials associated with the resource event device from the data repository of the network location.

At Decision 640, a determination is made as to whether the resource provider/user has chosen to (i) accept the parameters and continue using the resource event device, or (ii) decline the parameters and remove the resource event device. In response to the resource provider/user, accepting the parameters, at Event 650, at least one future resource event is reconfigured based on application of the accepted parameters. In response to the resource provider/user, declining the parameters, at Event 660, a message is communicated to the resource recipient that initiates removal of the resource event credentials associated with the resource event device.

Referring to FIG. 7 a flow diagram is depicted of a method 700 for deleting/removing a resource event device from a network location, in accordance with embodiments of the present invention. At Event 710, an input is received from a resource provider that indicates a desire to remove/delete a resource event device from the data repository of a network location. In effect, remove/delete the resource event credentials from the data repository to effectively remove/delete the resource event device from the network location. In specific embodiments of the method, the input is received at a resource event device management portal or the like controlled by the resource holding entity that issued the resource event device.

In response to receiving the input, at Event 720, an intent of the resource provider in providing the input is determined. In specific embodiments of the method, intent is determined by implementing AI or the like to analyze historical data (e.g., historical resource event data or historical resource holding entity product acquisition/cancellation data or the like) to determine a probable/possible intent and, in response, queries are presented to the resource provider in an attempt to confirm the probable/possible intent as the actual intent. If the queries are unable to confirm the probable/possible intent as the actual intent, further iterative analysis of the historical data and presentation of confirming queries are performed until the intent is confirmed.

In response to determining the intent, at Event 730, one or more actions are performed based on the intent. For example, when the intent is determined to be cancelation of a recurring resource event, the actions may comprise messaging the resource recipient to indicate the resource provider's intention to cancel the recurring resource event, receiving a response from the resource recipient that provides parameters for continuing the recurring resource event, presenting the resource provider with an option to either accept the parameters and continue the recurring resource event or decline the parameters and delete the resource event device from the network location. In response to the resource recipient accepting the parameters, another message is communicated to the resource recipient that indicates the acceptance of the parameters and, in response to the resource provider declining the parameters, another message is communicated to the resource recipient that indicates declination of parameters and initiates the removal of the resource event credentials associated with the resource event device from the network location. In other examples, when the intent is determined to be replacing the resource event device with another resource event device from the same resource holding entity, the actions may comprise presenting to the resource provider one or more other resource event devices held by the resource recipient and issued by the same resource holding entity and, in response, receiving an input from the resource recipient that selects one of the other resource event devices. In response to the input/selection, a message is communicated to the resource recipient that initiates replacing the resource event credentials of the existing resource event device (i.e., deleting the credentials) with resource event credentials of the selected resource event device). Conversely, when the intent is determined to be replacing the resource event device with another resource event device from a different resource holding entity, the actions may comprise determining resource provider-specific parameters for continuing use of the resource event device, presenting the resource provider with an option to either accept the parameters and continue use of the resource event device or decline the parameters and delete the resource event device from the network location. In response to the resource recipient accepting the parameters, reconfiguring future resource events based on the accepted parameters and, in response to the resource provider declining the parameters, communicating a message to the resource recipient that initiates the removal of the resource event credentials associated with the resource event device from the network location.

Thus, present embodiments of the invention provide for intelligently determining the intent of a resource provider when attempting to delete a resource event device, specifically the resource event credentials associated with the resource event device, from a network location. In specific embodiments of the invention, intent is determined by implementing Artificial Intelligence (AI) to analyze the resource provider's historical data to determine a probable/possible intent and, in response, queries are presented to the resource provider that attempt to confirm the probable/possible intent as the actual intent. In response to determining the intent, the invention is configured to perform one or more actions that are based on the determined intent.

The features, functions, and advantages that have been discussed may be achieved independently in various embodiments of the present invention or may be combined with yet other embodiments, further details of which can be seen with reference to the following description and drawings.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for resource event device removal, the system comprising:
    a network location associated with a resource recipient, wherein the network location includes a data repository that stores resource event credentials associated with one or more resource event devices held by a resource provider and issued by a resource holding entity; and
    a computing platform controlled by the resource holding entity and including a memory and at least one computing processing device in communication with the memory, wherein the memory stores instructions that are executable by one or more of the at least one computing processing devices and are configured to:
        receive an input from the resource provider that indicates a desire to remove at least a portion of the resource event credentials from the network location associated with the resource recipient;
        in response to receiving the input, determine an intent of the resource provider in providing the input; and
        in response to determining the intent, perform an action associated with the determined intent, wherein the action comprises communicating a first message to the resource recipient that indicates the intent of the resource provider to cancel the recurring resource event;
        in response to communicating the first message to the resource recipient, receiving a response message from the resource recipient that provides parameters for continuing the recurring resource event;
        presenting, to the resource provider, an input option to (i) accept the parameters for continuing the recurring resource event, or (ii) decline the parameters and cancel the recurring resource event;
        in response to the resource provider providing a second input that accepts the parameters for continuing the recurring resource event, communicating a second message to the resource provider that indicates acceptance of the parameters by the resource provider, and
        in response to the resource provider providing the second input that declines the parameters for continuing the recurring resource event, communicating a third message to the resource provider that indicates declination of the parameters by the resource provider and initiates removal, from the data repository, of the resource event credentials associated with the at least one of the one or more resource event devices.

2. The system of claim 1, wherein the instructions configured to determine the intent of the resource provider are further configured to:
    implement artificial intelligence (AI) to analyze historical data associated with the resource provider to identify at least one possible intent of the resource provider,
    present one or more queries to the resource provider that are configured to confirm the possible intent, and
    receive responses to the one or more queries that confirm the possible intent as the intent of the resource provider.

3. The system of claim 2, wherein the instructions configured to determine the intent of the resource provider are further configured to:
    receive responses to the one or more queries that fail to confirm the possible intent as the intent of the resource provider, and
    in response to the responses to the one or more queries that fail to confirm the possible intent, iteratively, perform further analysis of the historical data, and continually present additional queries until responses to the additional queries confirm the intent of the resource provider.

4. The system of claim 1, wherein the instructions configured to determine the intent of the resource provider are further configured to determine that the resource provider intends to cancel a recurring resource event conducted between the resource provider and the resource recipient that uses the resource event credentials associated with at least one of the one or more resource event devices.

5. The system of claim 1, wherein the instructions configured to determine the intent of the resource provider are further configured to determine that the resource provider intends to replace the resource event device with another resource event device.

6. The system of claim 5, wherein the instructions configured to determine the intent of the resource provider are further configured to determine that the other resource event device is associated with a same resource holding entity as the resource event device, and wherein the instructions configured to perform the action further define the action as including:
    receiving a third input from the resource provider that selects the other resource event device from amongst one or more other resource event devices, and
    communicating a message to the resource recipient that initiates replacement of the resource event credentials associated with the resource event device with other resource event credentials associated with the selected other resource event device.

7. The system of claim 5, wherein the instructions configured to determine the intent of the resource provider are further configured to determine that the other resource event device is associated with a different resource holding entity as the resource event device, and wherein the instructions configured to perform the action further define the action as including:
    determining resource provider-specific parameters for continuing use of the resource event device, and
    presenting, to the resource provider, an input option to (i) accept the parameters for continuing use of the resource event device, or (ii) decline the parameters and remove the resource event credentials associated with the resource event device from the data repository.

8. The system of claim 7, wherein the instructions configured to perform the action further define the action as including:
    in response to the resource provider providing the second input that accepts the parameters for continuing use of the resource event device, reconfiguring at least one resource events based on the accepted parameters, and
    in response to the resource provider providing the second input that declines the parameters for continuing the recurring resource event, communicating a message to the resource provider that initiates removal of the resource event credentials associated with the resource event device from the data repository.

9. A computer-implemented method for removing a resource event device from a network location, the computer-implemented method is executed by one or more computer processing devices and comprises:
  receiving an input from a resource provider that indicates a desire to remove, from a data repository at a network location, at least a portion of resource event credentials associated with at least one resource event device held by the resource provider;
  in response to receiving the input, determining an intent of the resource provider in providing the input; and
  in response to determining the intent, performing an action associated with the determined intent;
  determining that the resource provider intends to cancel a recurring resource event conducted between the resource provider and the resource recipient using the resource event credentials associated with at least one of the one or more resource event devices, and
  wherein performing the action further comprises:
  communicating a first message to the resource recipient that indicates the intent of the resource provider to cancel the recurring resource event;
  in response to communicating the first message to the resource recipient, receiving a response message from the resource recipient that provides parameters for continuing the recurring resource event;
  presenting, to the resource provider, an input option to (i) accept the parameters for continuing the recurring resource event, or (ii) decline the parameters and cancel the recurring resource event;
  in response to the resource provider providing a second input that accepts the parameters for continuing the recurring resource event, communicating a second message to the resource provider that indicates acceptance of the parameters by the resource provider, and
  in response to the resource provider providing the second input that declines the parameters for continuing the recurring resource event, communicating a third message to the resource provider that indicates declination of the parameters by the resource provider and initiates removal, from the data repository, of the resource event credentials associated with the at least one of the one or more resource event devices.

10. The computer-implemented method of claim 9, determining the intent of the resource provider further comprises:
  implementing artificial intelligence (AI) to analyze historical data associated with the resource provider to identify at least one possible intent of the resource provider;
  presenting one or more queries to the resource provider that are configured to confirm the possible intent, and either,
  receiving responses to the one or more queries that seek to confirm the possible intent as the intent of the resource provider; or
  receiving responses to the one or more queries that fail to confirm the possible intent as the intent of the resource provider;
  in response to the receiving the responses to the one or more queries that fail to confirm the possible intent iteratively:
    analyzing the historical data further to identify further possible intent; and
    continually presenting additional queries that seek to confirm the further possible intent until responses to the additional queries confirm the further possible intent as the intent of the resource provider.

11. The computer-implemented method of claim 9, wherein determining the intent of the resource provider further comprises:
  determining that the resource provider intends to replace the resource event device with another resource event device; and
  determining that the other resource event device is associated with a same resource holding entity as the resource event device, and
  wherein performing the action further comprises:
  receiving a second input from the resource provider that selects the other resource event device from amongst one or more other resource event devices, and
  communicating a message to the resource recipient that initiates replacement of the resource event credentials associated with the resource event device with other resource event credentials associated with the selected other resource event device.

12. The computer-implemented method of claim 9, wherein determining the intent of the resource provider further comprises:
  determining that (i) the resource provider intends to replace the resource event device with another resource event device, and (ii) the other resource event device is associated with a different resource holding entity as the resource event device, and
  wherein the performing the action further comprises:
  determining resource provider-specific parameters for continuing use of the resource event device for the recurring resource events;
  presenting, to the resource provider, an input option to (i) accept the parameters for continuing use of the resource event device, or (ii) decline the parameters and remove the resource event credentials associated with the resource event device from the data repository;
  either:
    in response to the resource provider providing a second input that accepts the parameters for continuing use of the resource event device, reconfiguring at least one resource event based on the accepted parameters; or
    in response to the resource provider providing the second input that declines the parameters for continuing the recurring resource event, communicating a message to the resource provider that initiates removal of the resource event credentials associated with the resource event device from the data repository.

13. A computer program product comprising: a non-transitory computer-readable medium comprising:
  a first set of codes for causing a first computer to receive an input from a resource provider that indicates a desire to remove, from a data repository at a network location, at least a portion of resource event credentials associated with at least one resource event device held by the resource provider;
  a second set of codes for causing a second computer to determine that the resource provider intends to cancel a recurring resource event conducted between the resource provider and the resource recipient using the resource event credentials associated with at least one of the one or more resource event devices; and
  a third set of codes for causing a third computer to:
    communicate a first message to the resource recipient that indicates the intent of the resource provider to cancel the recurring resource event, in response to communicating the first message to the resource recipient, receive a response message from the resource recipient that provides parameters for continuing the recurring resource event, present, to the resource provider, an input option to (i) accept the parameters for continuing the recurring resource event, or (ii) decline the parameters and cancel the recurring resource event, either:
in response to the resource provider providing a second input that accepts the parameters for continuing the recurring resource event, communicate a second message to the resource provider that indicates acceptance of the parameters by the resource provider, or in response to the resource provider providing the second input that declines the parameters for continuing the recurring resource event, communicating a third message to the resource provider that indicates declination of the parameters by the resource provider and initiates removal, from the data repository, of the resource event credentials associated with the at least one of the one or more resource event devices.

14. The computer program product of claim 13, wherein the third set of codes are further configured to cause the third computer to:
implement artificial intelligence (AI) to analyze historical data associated with the resource provider to identify at least one possible intent of the resource provider,
present one or more queries to the resource provider that are configured to confirm the possible intent, and
either:
receive responses to the one or more queries that seek to confirm the possible intent as the intent of the resource provider, or
receive responses to the one or more queries that fail to confirm the possible intent as the intent of the resource provider,
in response to the receiving the responses to the one or more queries that fail to confirm the possible intent iteratively:
analyze the historical data further to identify further possible intent, and
continually present additional queries that seek to confirm the further possible intent until responses to the additional queries confirm the further possible intent as the intent of the resource provider.

15. The computer program product of claim 13, wherein the second set of codes are further configured to:
determine that (i) the resource provider intends to replace the resource event device with another resource event device, and (ii) the other resource event device is associated with a same resource holding entity as the resource event device, and
wherein the third set of codes are further configured to cause the third computer to:
receive the second input from the resource provider that selects the other resource event device from amongst one or more other resource event devices, and
communicate a message to the resource recipient that initiates replacement of the resource event credentials associated with the resource event device with other resource event credentials associated with the selected other resource event device.

* * * * *